Patented Mar. 16, 1954

2,671,985

UNITED STATES PATENT OFFICE 2,671,985

HERBICIDE-RESISTANT COATED SEED

Phelps Vogelsang, Midland, Mich., assignor to Processed Seeds Inc., Midland, Mich., a corporation of Michigan No Drawing. Application October 23, 1948, Serial No. 56,260

4 Claims. (Cl. 47—1)

The present invention is concerned with an improvement in coatings for seeds which will protect the seeds from materials adversely affecting the germination and emergence of the seed. The invention is more particularly concerned with a seed coating which will permit soil to be sprayed with a chemical weed-killer at approximately the same time the seed is planted.

A method is known of coating seeds with a methyl cellulose plastic which will affix fungicides, growth stimulants, insecticides, nitrogen sources or fertilizers, et cetera, on the seed before planting. The coating technique may be applied to almost any type of seed and almost any type of desirable component. The components selected usually are those which are deemed necessary to control seed and soil-borne diseases, control soil insects, fertilize the seedling, stimulate the growth of the plant, and to add trace mineral elements that will give a healthy seedling and increase plant growth. For instance, after many carefully regulated experiments, I have found that one of the best methods of controlling the fungus, onion smut, is by incorporation into the coating of up to 100 percent by weight of the naked seed weight of a fungicide, tetramethylthiuram disulphide. Similarly, various insecticides, such as DDT, calomel, bichloride of mercury, lead arsenate, para-dichlorobenzene, et cetera, may be incorporated to reduce the attack of maggots and wire worms, and the take of rodents and birds. I have also found it possible to include hormones, such as indol-butyric acid; plant stimulants, such as iron extract of chlorophyll, inositol, vitamin $B_1$, amino acids, phenolbarbital, streptomycin, radioactive materials, and minor elements, such as boron, manganese and the like, all of which are essential to the successful growth of the plant.

This coating process gives a seed which, except for the need of air, sunlight, and water, is self sufficient. However, it has been found that, in an attempt to improve the planting procedure using the processed seeds through the use of a standard chemical weed-killer at or about the time of planting, such weed-killer adversely affects the germination of the seed. Such adverse effects may be manifested by retardation or even prevention of germination and emergence.

It is a principal object of the present invention, therefore, to provide a method whereby seeds can be so coated as to germinate and show successful emergence despite treatment with chemical weed-killers of the area in which the seed is planted. It is a further object of this invention to provide a coated seed which will not be adversely affected by the common chemical weed-killers. Other objects will become apparent hereinafter.

The foregoing and additional objects have been accomplished by incorporating, preferably in a substantially concentric layer about the seed, a porous, highly-adsorptive substance such as activated charcoal, silica gel, zeolites, aluminas, et cetera. The porous activated substance appears to adsorb the chemical weed-killer in sufficient quantities to eliminate any harmful effects which the weed-killer might have on the germinating seed, without, in any appreciable manner, detracting from the effect on the weeds. The coating of adsorptive material may be attached to the seed in any convenient manner, as by spraying the coated seed with a water-soluble plastic, such as methyl cellulose, polyvinylalcohol, sodium alginate, et cetera, and then rolling and tumbling the seeds in the adsorptive substance. Methyl cellulose is particularly adapted for the purposes of the present invention since it is soluble in water at about 18 percent concentration, whereas the seeds do not germinate until a water concentration of about 22 per cent is reached. However, any plastic substance which is sufficiently tacky to hold the required amount of porous, adsorptive substance in a substantially concentric layer around the seed, is adequate. The quantity of porous, adsorbent material which is used will vary greatly according to the particular seed which is being treated, however, up to 200 percent by weight, based on the weight of the naked seed, is ordinarily sufficient. A preferred embodiment of the present invention contemplates the use of between about 25 percent and about 200 percent, still more preferably between about 100 and about 200 percent, by weight of the porous, highly-adsorbent substance based on the weight of the naked seed.

The seeds treated with the porous, adsorptive substance as described herein are found to withstand substantial concentrations of chemical weed-killers, without being adversely affected, As may be seen by the following examples, which are given to illustrate the practice of the present invention but are not to be construed as limiting, seeds coated with a single active ingredient, i. e., activated wood char, are very much superior to the untreated seeds.

A variety of seeds were prepared for testing by coating the individual seeds with feldspar and fly-ash, inert ingredients, bound together and to the seed by methyl cellulose, and some of these were set aside to be used as controls. In order that the experiment might be evaluated accurately, inert materials were used as the base materials, rather than food and growth stimulants, which, however, when incorporated into the coating represent a preferred embodiment of the present invention. Seeds coated with only feldspar and fly-ash are recorded in the following table as "no treatment." Some of the seeds were coated with feldspar and fly-ash, then with a layer of activated wood chars in the proportions by weight of 25, 50, 100, and 200 percent, based on the weight of the naked seed, and a final coat of feldspar and fly-ash, all bound with methyl cellulose. The carbons used were all activated wood chars obtained from standard commercial sources. The seeds, thus coated, were placed into a flat containing soil which had been treated with 800 parts by weight of the sodium salt of 2,4-dichlorophenoxyacetic acid per million parts of dirt. In addition, a substantial amount of the weed seed, trefoil, was planted to ensure test conditions which are comparable to the rigors endured by a seed in the field. In the following chart are shown results (reproducible within about ±5%) which I have obtained using the test conditions as outlined above.

| Seed | Percent Carbon | Emergence in Percent | | |
|---|---|---|---|---|
| | | Carbon Treated | No Treatment | Trefoil |
| Stokedale Tomato | 25 | 16.2 | 1.2 | 4.6 |
| | 50 | 14.7 | | |
| | 100 | 51.4 | | |
| | 200 | 86.6 | | |
| Early Michigan Cucumber | 25 | 8.1 | .4 | 6.1 |
| | 50 | 8.4 | | |
| | 100 | 67.3 | | |
| | 200 | 94.2 | | |
| Chantenay Carrot | 25 | 31.8 | 4.27 | 12.2 |
| | 50 | 72.2 | | |
| | 100 | 78.4 | | |
| | 200 | 74.4 | | |
| Savoy Spinach | 25 | 81.6 | 27.1 | 16.4 |
| | 50 | 88.2 | | |
| | 100 | 91.0 | | |
| | 200 | 90.2 | | |
| Saxa Radish | 25 | 21.0 | 16.9 | 11.2 |
| | 50 | 42.3 | | |
| | 100 | 91.7 | | |
| | 200 | 92.4 | | |
| Y Globe Onion | 25 | 70.2 | 38.4 | 8.0 |
| | 50 | 70.8 | | |
| | 100 | 83.6 | | |
| | 200 | 91.4 | | |
| Golden Acre Cabbage | 25 | 7.1 | 6.7 | 8.2 |
| | 50 | 37.2 | | |
| | 100 | 89.1 | | |
| | 200 | 89.6 | | |
| Sugar Beet | 25 | 17.4 | 11.2 | 7.4 |
| | 50 | 11.1 | | |
| | 100 | 74.1 | | |
| | 200 | 79.7 | | |

It is readily apparent, upon studying the above chart, that with a coating of activated wood char, an emergence on the order of 90 percent may be expected with optimum amounts of adsorptive substance, while, without the porous, adsorptive substance present, an emergence varying from .4% to 40% is all that may be obtained. While the greatest amount of trefoil that emerged was 16%, without the treatment of "2, 4-D," an emergence of about 90% is obtained. It is to be emphasized that the results listed above were obtained using only inert materials and activated wood char. The addition of hormones, plant stimulants, fertilizers, trace mineral elements, et cetera, which may be though of as food and growth stimulants, allows even better emergence to be obtained, as well as ensuring that a substantial percentage of the emerging seeds will develop into healthy, fully-developed plants.

Although the porous, highly-adsorptive substance used in the above examples was activated wood char, any of the common adsorbents such as the activated carbons, silica gel, zeolites, aluminas, et cetera, can be employed in the practice of my invention. The layers of the coating may be built up in any convenient manner using any of the substances as hereinbefore described with, if desired, the layer of porous, highly-adsorptive substance being the last layer incorporated. A preferred arrangement of layers of the coating is to have the porous, highly-adsorptive substance as an intermediate layer of coating on the seed.

While optimum results are obtained by forming a substantially concentric intermediate layer of the porous, highly-adsorptive substance in the seed coating, the substance may be dispersed throughout the seed coating with advantageous results, although a higher proportion of the adsorbent substance may have to be employed in some instances.

Various modifications may be made in the method of the present invention in the light of the above disclosure without departing from the spirit or scope thereof, and it is to be understood that I limit myself only as defined in the appended claims.

I claim:

1. A herbicide-resistant coated seed, whereby herbicidal agents having an adverse effect on the germination of seeds are substantially ineffectual as respects decreasing germination result of said seed, and whereby said seed is so protected from said herbicidal agents until germination conditions are afforded, and whereby substantially complete utilization of germination conditions occurs whenever afforded after planting, which comprises: a seed having substantially concentric layers of coating, at least one intermediate of said layers being activated wood char, and at least one other of said layers being food and growth stimulants for the germinating seed, the said coating including methyl cellulose as the binder.

2. A herbicide-resistant coated seed, whereby herbicidal agents having an adverse effect on the germination of seeds are substantially ineffectual as respects decreasing germination result of the seed, and whereby said seed is so protected from said herbicidal agents until germination conditions are afforded, and whereby substantially complete utilization of germination conditions occurs whenever afforded after planting, which comprises: a seed having substantially concentric layers of coating materials, at least one of said layers containing activated wood char in proportions of up to about 200 percent by weight, based on the weight of the naked seed, said wood char being bound to said seed by a binder soluble in a water concentration of about 22 percent.

3. A herbicide-resistant coated seed, whereby herbicidal agents having an adverse effect on the germination of seeds are substantially ineffectual as respects decreasing germination result of the seed, and whereby said seed is so protected from said herbicidal agents until germination conditions are afforded, and whereby substantially complete utilization of germination conditions occurs whenever afforded after planting, which comprises: a seed having substantially concentric layers of coating materials, said coating material including an adsorbent for herbicides and a binder soluble in water at substantially the concentration required for seed germination, but insoluble in water concentrations substantially below that required for the germination of seeds.

4. A herbicide-resistant coated seed, whereby herbicidal agents having an adverse effect on the germination of seeds are substantially ineffectual as respects decreasing germination result of the seed, and whereby said seed is so protected from said herbicidal agents until germination conditions are afforded, and whereby substantially complete utilization of germination conditions occurs whenever afforded after planting, which comprises: a seed having substantially concentric coatings, one coating including wood char in an amount up to about 200 percent based on the weight of the seed, said wood char being bound to said coating at least in part by methyl cellulose.

PHELPS VOGELSANG.

References Cited in the file of this patent

UNITED STATES PATENTS

| Number | Name | Date |
|---|---|---|
| 99,094 | Lassing | Jan. 25, 1870 |
| 2,216,045 | Powers | Sept. 24, 1940 |
| 2,296,584 | Stummeyer | Sept. 22, 1942 |
| 2,313,057 | Fischer | Mar. 9, 1943 |

FOREIGN PATENTS

| Number | Country | Date |
|---|---|---|
| 109,751 | Australia | Feb. 22, 1940 |
| 411,040 | Germany | Mar. 24, 1925 |
| 448,371 | Germany | Aug. 20, 1927 |
| 506,731 | Germany | Sept. 8, 1930 |
| 227,306 | Switzerland | Sept. 1, 1943 |

OTHER REFERENCES

Science, vol. 105, No. 2726, p. 340, March 28, 1947.